United States Patent
Fariborz et al.

(10) Patent No.: US 6,721,782 B1
(45) Date of Patent: Apr. 13, 2004

(54) METHOD OF AND SYSTEM FOR ASSIGNING DOCUMENTS IN A WORKFLOW SYSTEM

(75) Inventors: Michael F. Fariborz, St. Louis, MO (US); Clifton E. Grim, III, Seabrook, TX (US); John D. Wilson, Houston, TX (US); Mark B. Stevens, Houston, TX (US); Michael J. Weisskopf, Seabrook, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 09/603,731

(22) Filed: Jun. 23, 2000

(51) Int. Cl.[7] .............................................. G06F 13/00
(52) U.S. Cl. ...................... 709/204; 709/203; 709/205; 709/219; 707/10
(58) Field of Search ................................ 709/200, 201, 709/202, 203, 212, 213, 216, 217, 218, 219, 223, 227, 229, 204, 205; 707/1, 2, 6, 7, 9, 10

(56) References Cited

U.S. PATENT DOCUMENTS

| | | | | |
|---|---|---|---|---|
| 5,241,645 A | | 8/1993 | Cimral | 395/500 |
| 5,446,740 A | * | 8/1995 | Yien et al. | 370/110.1 |
| 5,568,489 A | * | 10/1996 | Yien et al. | 370/110.1 |
| 5,724,574 A | * | 3/1998 | Stratigos et al. | 395/610 |
| 5,764,972 A | | 6/1998 | Crouse | 395/601 |
| 5,793,983 A | | 8/1998 | Albert | 395/858 |
| 5,812,819 A | | 9/1998 | Rodwin | 395/500 |
| 5,910,988 A | | 6/1999 | Ballard | 380/24 |
| 5,918,016 A | | 6/1999 | Brewer | 395/200.5 |
| 6,553,365 B1 | * | 4/2003 | Summerlin et al. | 707/2 |

* cited by examiner

Primary Examiner—Moustafa M. Meky
(74) Attorney, Agent, or Firm—Karl O. Hesse; Norman L. Gundel

(57) ABSTRACT

A method of and system for assigning documents to users in a workflow system initially assigns a document to a specified role, rather than to a specified individual for review, further processing, and/or approval. The system determines the users signed on to the system in the specified role, and assigns the unassigned document to one of the signed on users. The system determines the users signed on to the system in the specified role by maintaining a role document for the specified role. The role document includes a list of the users assigned to the specified role and the signon/signoff status of each assigned user. The system assigns the document to a user on the role document whose signon/signoff status is signed on according to an assignment algorithm. The system updates the signon/signoff status of the role document whenever a user signs on to or off of the system.

1 Claim, 3 Drawing Sheets

METHOD OF AND SYSTEM FOR ASSIGNING DOCUMENTS IN A WORKFLOW SYSTEM

FIELD OF THE INVENTION

The present invention relates generally to the field of workflow process management, and more particularly to a method of and system for dynamically assigning documents in a workflow environment in which users may be disconnected.

DESCRIPTION OF THE PRIOR ART

The use of computer systems as a means of gathering and processing information has become commonplace in organizations. Many processes or tasks are performed in stages, wherein each stage is performed by a different member of the organization according to rules of the organization. Typically, a member of the organization creates an initial draft of a document or report and passes the initial document to a reviewer for review, further processing, and/or approval. In some organizations, the document may be passed through several layers of review and approval. The automated flow of information in an organization is known as workflow.

In law enforcement organizations, police officers in the field gather information and make reports. These reports are reviewed by a supervisor. The reviewed reports may then be reviewed further by District Attorney and court personnel. Police officers are capable of generating reports in the field with mobile computers, which are typically disconnected from a network. Reviewing officers may also work disconnected from, or not signed on to, the network.

A major problem in disconnected user environments is that the user cannot determine, at the time the user is ready to submit the document, which reviewer is currently connected or signed on to network. Thus, the user does not know to whom the document should be assigned for processing and review. If the user assigns the document to a particular reviewer that is not connected or signed on to the network, there may be substantial delay in processing the work.

SUMMARY OF THE INVENTION

The present invention provides a method of and system for assigning documents to users in a workflow system. According to the present invention, a document is initially assigned to a specified role, rather than to a specific individual. The method and system of the present invention determine the users signed on to the system in the specified role, and assign the unassigned document to one of the signed on users.

The method and system of the present invention determine the users signed on to the system in the specified role by maintaining a role document for the specified role. The role document includes a list of the users assigned to the specified role and the signon/signoff status of each assigned user. The system assigns the document, according to an assignment algorithm, to a user on the role document whose signon/signoff status is signed on. The system updates the signon/signoff status of the role document whenever a user signs on to or off of the system.

The method and system are adapted for use in an, environment in which users work disconnected from the network. When a disconnected user creates or modifies a document, the disconnected user assigns the document to a role and stores the document locally in a special status, referred to as deferred-submitted. When the disconnected user connects to the network, any documents stored in the deferred-submitted status are replicated and the system assigns such documents to users according to the present invention.

DESCRIPTION OF THE PREFERRED EMBODIMENT

Figure 1:
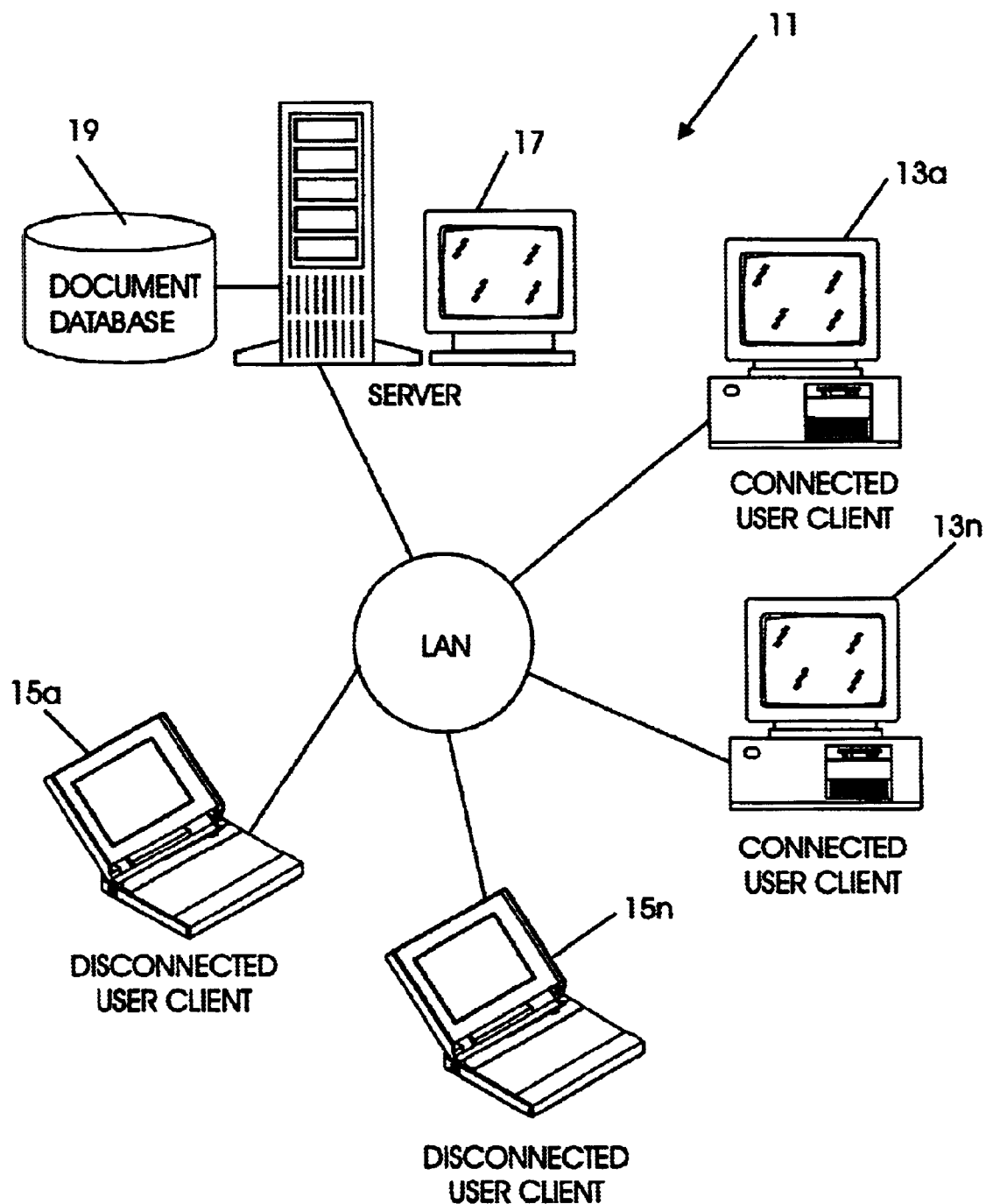
FIG. 1 is a block diagram of a system according to the present invention.

Referring now to the drawings, and first to FIG. 1, a system according to the present invention is designated generally by the numeral 11. System 11 provides a platform for a workgroup environment in which users create, modify, review, approve, and otherwise process documents according to organization rules. An example of an organization that would find application for a system of the present invention is a law enforcement organization.

System 11 is implemented in a client/server environment that includes a plurality of user clients. The user clients include connected user client machines 13 and disconnected user client machines 15. Connected user machines 13 are preferable implemented in desktop personal computers or workstations that are connected to a network such as a local area network (LAN). Disconnected user client machines 15 are preferably implemented in mobile computing devices, such as laptop or notebook computers. However, disconnected user client machines may also be implemented in desktop personal computers or workstations that are periodically used in a disconnected mode in which such machines are physically connected to, but not logged onto, the network. Mobile disconnected user client machines are adapted to connect to the network periodically through wireless connections, docking stations, port emulators, or other physical interfaces.

Users use client machines 13 and 15 to work with documents according to the present invention. For example, disconnected client machines 15 may be assigned to law enforcement officers that work in the field. The field officers travel about territories in vehicles. During the course of their work, the field officers are required to create documents, such as accident reports, crime scene investigation reports, and the like. Such documents typically require review or action by other officers, such as supervisors.

When a field officer is working in a disconnected environment, the field officer typically does not know who will be available to review or take action on a particular document when the document is replicated to the network. If the field officer designates a particular reviewer for a document, the designated reviewer may not be available when the document is replicated to the network. Accordingly, according to the present invention, the field officer designates a role, rather than a particular individual, to review or take action on the document. Examples of roles according to the present invention include approver, reviewer, supervisor, etc.

If the field officer is working in a disconnected environment, the field officer stores completed documents locally on the disconnected client machine in a deferred-submitted state. When the disconnected client machine is connected to the network, the documents stored in the deferred-submitted state are replicated to a server 17. Server 17 stores the replicated documents in a document database 19.

Periodically, server 17 assigns unassigned documents stored in document database 19 according to the present invention. For each defined role, the system maintains a role document. Each role document comprise a list of the individuals in the organization that are eligible or assigned to perform the role and the signon/signoff status of each listed individual. An individual may be assigned to more than one role. A signon/signoff application programming interface (API) is provided to update the signon/signoff status of the role documents. A server process executes to assign an unassigned document to an individual according the appropriate role document and an assignment algorithm. For example, the assignment algorithm may be a simple round robin scheme in which each document is assigned to the next listed signed on individual on the role document. Alternatively, the documents may be assigned according to a load balancing algorithm. In the preferred embodiment, the assignment algorithm code is externalized so that the assignment scheme may be changed if the need arises.

Although the designation of a role, rather than particular individual, is well adapted for documents created on a disconnected user client machine, it should be noted that designation of a role is advantageous for documents created on a connected user client machine as well. For example, a connected user may not know which reviewers are signed on to the network at the time the user submits a document. If the user designates an individual that is not signed on, the document will be unavailable for review until the designated individual signs on. Also, users may tend to designate certain individuals more frequently than others, leading to workload imbalances. The present invention relieves the user from having to designate a particular individual. The present invention effectively maintains a pool of individuals currently signed on to various roles. When a document is submitted, the system of the present invention assigns the document automatically and substantially immediately to an appropriate individual according to an assignment algorithm. Thus, the present invention increases the efficiency and document throughput of a workflow system.

Figure 2:
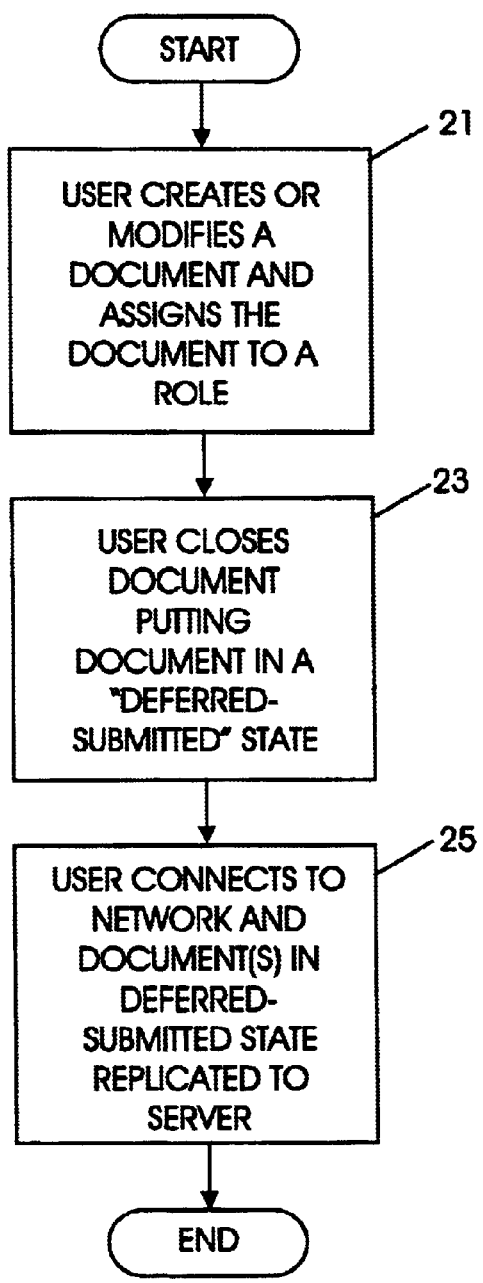
FIG. 2 is a flowchart of disconnected user document creation or modification processing according to the present invention.

The operation of the method and system of the present invention is further illustrated with reference to the flowcharts of FIGS. 2–4. Referring first to FIG. 2, there is illustrated the document creation and modification process according to the present invention. A disconnected user creates or modifies a document, and assigns the document to a role, at block 21. When the user is finished creating or modifying the document, the user closes the document, which stores the document locally in a deferred-submitted state, as indicated at block 23. When the disconnected user connects to the network, any document in the deferred-submitted state is replicated to the server, as indicated at block 25.

Figure 3:
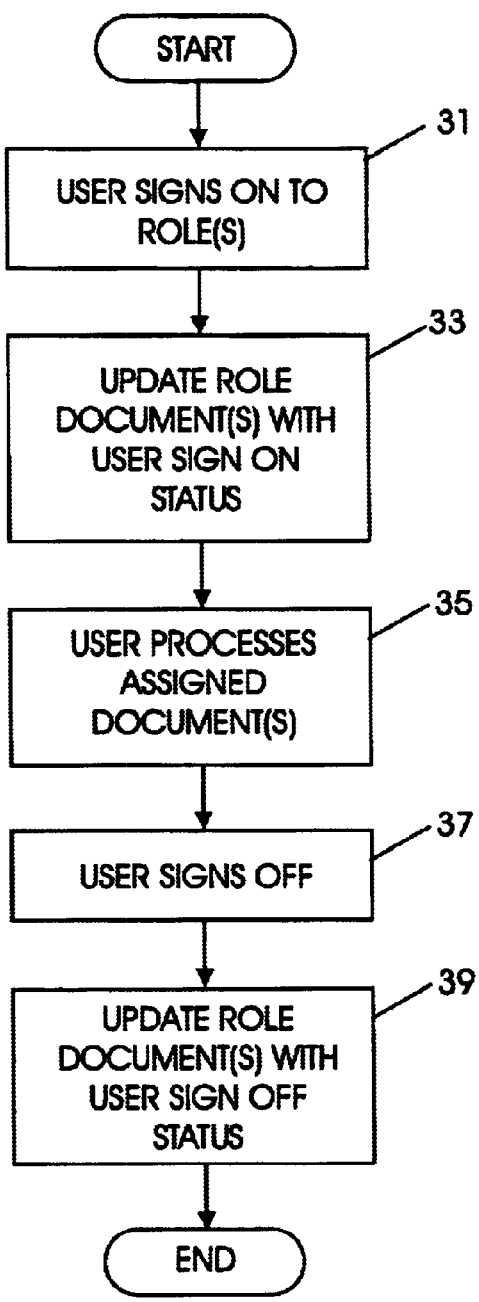
FIG. 3 is a flowchart of role document maintenance processing according to the present invention.

Referring now to FIG. 3, there is illustrated the process of signing on to and off of roles according to the present invention. A user signs, on one or more roles, as indicated at block 31. The signon/signoff API updates the role document or documents to indicate that the user is signed on, at block 33. The user proceeds with his or her work, which may include processing assigned documents, as indicated at block 35. When the user is finished working, the user signs off, at block 37. Then the signon/signoff API updates the role document or documents to indicate that the user is signed off, as indicated at block 39.

Figure 4:
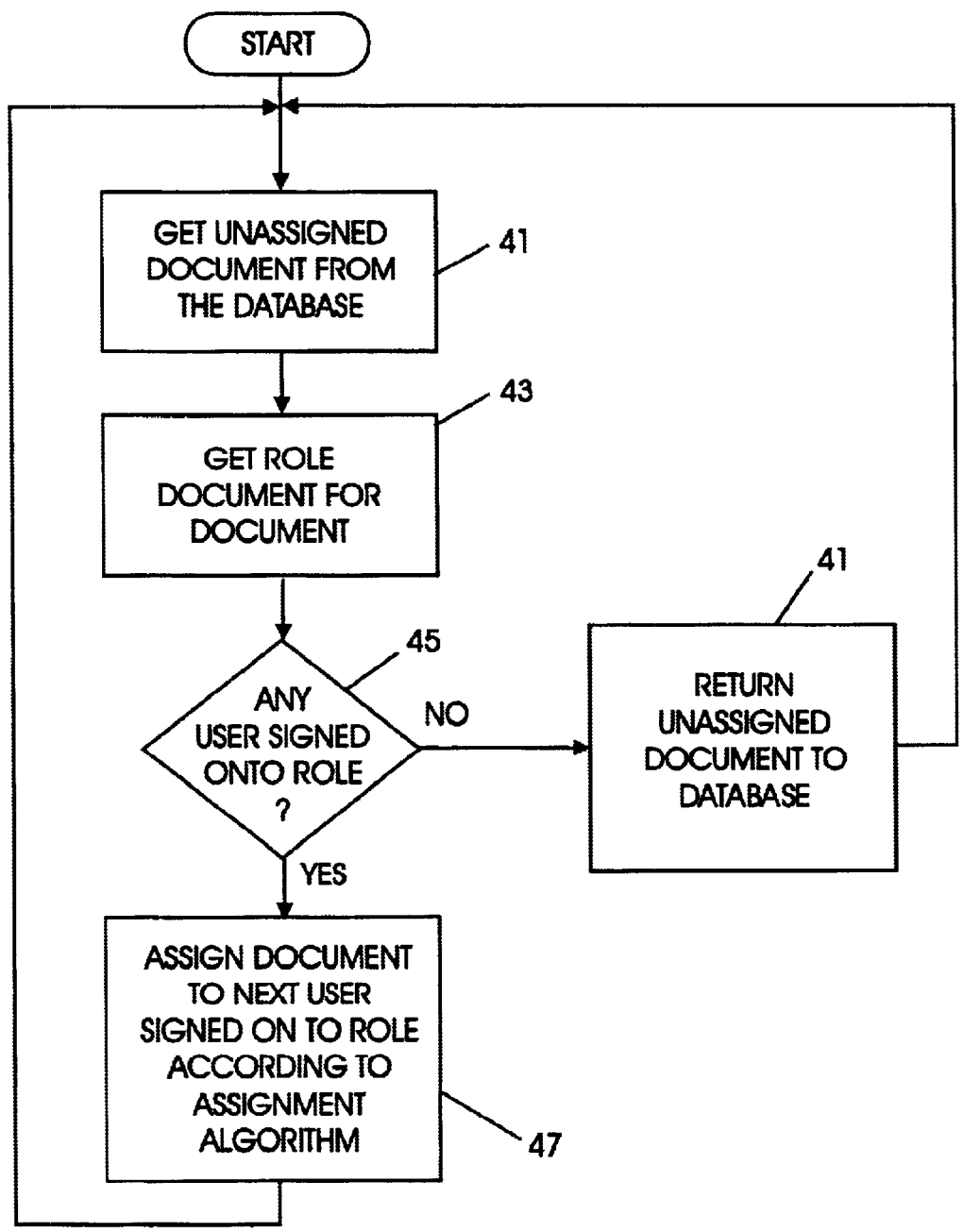
FIG. 4 is a flowchart of document assignment processing according to the present invention.

Referring finally to FIG. 4, there is illustrated document assignment processing according to the present invention. The server gets an unassigned document from the document database, at block 41. Then, the server gets the role document for the document, at block 43. If, as determined at decision block 45, a user is signed on to the role, the server assigns the document to a user signed on to the role according to the assignment algorithm, as indicated at block 47, and processing returns to block 41. It will be recalled that assignment algorithms are interchangeable. If, as determined at decision block 45, no user is signed on to the role, the server returns the unassigned document to the document database, as indicated at block 49, and processing returns to block 41.

From the foregoing, it may be seen that the present invention is well adapted to overcome the shortcomings inherent in providing a workgroup solution to organizations in which users may work in a disconnected environment. The inherent shortcomings include the problems of 1) assigning the document to a second user when a first user is disconnected; 2) assigning the document to a second user who is immediately available to review the document; and, 3) determining to whom, of the second users available to review the document immediately, to assign the document.

The first problem is solved, according to the present invention, by assigning the document to a role, rather than a specific individual, and putting the document into a deferred-submitted state. Once the user connects to the network and the document is replicated to the server, a server process does the actual assignment to an individual, without intervention by the user that created or modified the document.

The second problem is solved, according to the present invention, by the role documents and the signon/signoff APIs. The reviewing user becomes eligible to have documents assigned by signing on to a role document. When the user signs on to the role document, the user may receive documents to review immediately. The user can control how many documents are assigned to him or her by signing off the system. The user can then work disconnected to catch up if his or her workload becomes too large.

The third problem is solved by the interchangeable assignment algorithms of the present invention. The server process can use an algorithm, such as round robin or load balancing, that is appropriate.

The present invention has been illustrated and described with respect to presently preferred embodiments. Those skilled in the art will recognize alternative embodiments and implementations, given the benefit of this description. For example, while the preferred embodiment is used in a disconnected environment, those skilled in the art will recognize that the invention finds application in environments in which all users work connected. Accordingly, the foregoing description is intended for purposes to illustration rather than limitation.

What is claim is:

1. A method of assigning documents created by disconnected users to reviewers in a workflow system, which comprises the steps of:

receiving into said workflow system at a disconnected field workstation, an initial document created by a disconnected user;

receiving at said disconnected field workstation, an assignment by said disconnected user of said initial document to a specified role;

storing at said disconnected field workstation, in a deferred submitted status, said initial document and said assignment of said initial document;

replicating said initial document and said assignment of said initial document to a database of said workflow system when said field workstation is connected to a network of said workflow system;

maintaining a plurality of role documents in said workflow system, one of said role documents including a list of reviewers assigned to said specified role and a signon/signoff status of each assigned reviewer;

updating said signon/signoff status whenever a reviewer signs on to or off of said workflow system;

assigning, according to an assignment algorithm, said document to an assigned reviewer listed on said one of said role documents whose signon/signoff status is signed on;

replicating said initial document to a reviewer workstation of said assigned reviewer while said reviewer workstation is connected to said network of said workflow system;

allowing said reviewer to become disconnected by signing off of said network of said workflow system, in order to control how many documents are assigned to said reviewer at said reviewer workstation;

when said disconnected reviewer modifies said initial document, storing said modified document locally in a deferred submitted status;

replicating said modified document to said database of said workflow system when said disconnected reviewer connects to said network of said workflow system.

* * * * *